US010730527B2

(12) United States Patent
Wang et al.

(10) Patent No.: US 10,730,527 B2
(45) Date of Patent: Aug. 4, 2020

(54) IMPLEMENTING COGNITIVE STATE RECOGNITION WITHIN A TELEMATICS SYSTEM

(71) Applicant: INTERNATIONAL BUSINESS MACHINES CORPORATION, Armonk, NY (US)

(72) Inventors: Zhi Hu Wang, Beijing (CN); Shiwan Zhao, Beijing (CN); Jun Zhu, Shanghai (CN); Li Zhang, Beijing (CN); Guo Qiang Hu, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/210,175

(22) Filed: Dec. 5, 2018

(65) Prior Publication Data
US 2020/0180644 A1  Jun. 11, 2020

(51) Int. Cl.
*B60W 40/09* (2012.01)
*G06K 9/00* (2006.01)
*G07C 5/00* (2006.01)
*G06N 20/00* (2019.01)
*G07C 5/08* (2006.01)
*B60W 40/08* (2012.01)

(52) U.S. Cl.
CPC ......... *B60W 40/09* (2013.01); *G06K 9/00845* (2013.01); *G06N 20/00* (2019.01); *G07C 5/008* (2013.01); *G07C 5/0841* (2013.01); *B60W 2040/0872* (2013.01)

(58) Field of Classification Search
None
See application file for complete search history.

(56) References Cited

U.S. PATENT DOCUMENTS

| 9,149,236 | B2 | 10/2015 | Chun et al. | |
| 9,260,013 | B2 | 2/2016 | Kume et al. | |
| 9,733,097 | B2 * | 8/2017 | Sisbot | G01C 21/3461 |
| 9,934,667 | B1 | 4/2018 | Fields et al. | |
| 2002/0121981 | A1 * | 9/2002 | Munch | G08B 21/06 340/576 |
| 2006/0149428 | A1 | 7/2006 | Kim et al. | |

(Continued)

OTHER PUBLICATIONS

Trogolo, "The Role of Difficulties in Emotion Regulation on Driving Behavior", Journal of Behavior, Health & Social Issues, vol. 6, No. 1, May 2014, pp. 107-117.

(Continued)

*Primary Examiner* — Chico A Foxx
(74) *Attorney, Agent, or Firm* — Tutunjian & Bitetto, P.C.; Joseph Petrokaitis

(57) ABSTRACT

A computer-implemented method for implementing cognitive state recognition within a telematics system includes determining moving object operation behaviors of an operator of a moving object corresponding to respective select contextual combinations, generating a personalized base characteristic for each select contextual combination, recognizing a cognitive state based on a comparison of actual moving object operation behaviors associated with the select contextual combinations and corresponding ones of the personalized base characteristics, and automatically triggering one or more actions based on the cognitive state.

20 Claims, 7 Drawing Sheets

(56) References Cited

U.S. PATENT DOCUMENTS

| | | | |
|---|---|---|---|
| 2008/0180235 A1* | 7/2008 | Chang | A61B 5/01 340/449 |
| 2009/0109037 A1* | 4/2009 | Farmer | G06Q 20/102 340/576 |
| 2013/0054090 A1 | 2/2013 | Shin et al. | |
| 2014/0121927 A1* | 5/2014 | Hanita | B60T 7/14 701/70 |
| 2015/0057931 A1* | 2/2015 | Pivonka | G01C 21/3484 701/533 |
| 2016/0001781 A1* | 1/2016 | Fung | B60W 40/08 701/36 |
| 2017/0337438 A1* | 11/2017 | el Kaliouby, Jr. | A61B 5/0077 |
| 2017/0355377 A1* | 12/2017 | Vijaya Kumar | B60W 40/08 |
| 2017/0372431 A1* | 12/2017 | Perl | G07C 5/085 |
| 2018/0022358 A1* | 1/2018 | Fung | B60W 40/08 701/36 |
| 2018/0025430 A1* | 1/2018 | Perl | B60R 16/0231 705/4 |
| 2018/0049636 A1* | 2/2018 | Miller | A61B 5/04842 |
| 2018/0061415 A1* | 3/2018 | Penilla | G01C 21/3641 |
| 2018/0174457 A1* | 6/2018 | Taylor | B60W 40/08 |
| 2018/0281811 A1* | 10/2018 | Tochioka | B60W 50/12 |
| 2018/0300816 A1* | 10/2018 | Perl | G06Q 50/01 |
| 2019/0102689 A1* | 4/2019 | Lassoued | G07C 5/008 |

OTHER PUBLICATIONS

Lisetti, "Affective Intelligent Car Interfaces with Emotion Recognition", Proceedings of 11th International Conference on Human Interaction, Jul. 2005, 10 pages.

Pecher et al., The Influence of Emotions on Driving Behavior, Traffic Psychology and Driving Behavior, 2009, pp. 1-27, New York: Hindawi Publishers.

* cited by examiner

IMPLEMENTING COGNITIVE STATE RECOGNITION WITHIN A TELEMATICS SYSTEM

BACKGROUND

Technical Field

The present invention generally relates to artificial intelligence and machine learning, and more particularly to implementing cognitive state recognition within a telematics system.

Description of the Related Art

The operation of a vehicle can be impacted by the cognitive state of the vehicle's operator. For example, if a driver of an automobile is irritable, this can cause the driver to exhibit driving behaviors such as, e.g., anxious acceleration and/or harsh braking. Additionally, if the driver has been driving for a long, continuous amount of time or has been stuck in heavy traffic conditions, the driver can become both mentally and physically fatigued. Such cognitive states and corresponding behaviors can affect driving ability.

SUMMARY

In accordance with an embodiment of the present invention, a system for implementing cognitive state recognition within a telematics system is provided. The system includes a memory device for storing program code and at least one processor operatively coupled to the memory device. The at least one processor is configured to execute program code stored on the memory device to determine moving object operation behaviors of an operator of a moving object corresponding to respective select contextual combinations, generate a personalized base characteristic for each select contextual combination, recognize a cognitive state based on a comparison of actual moving object operation behaviors associated with the select contextual combinations and corresponding ones of the personalized base characteristics, and automatically triggering one or more actions based on the cognitive state.

In accordance with another embodiment of the present invention, a computer-implemented method for implementing cognitive state recognition within a telematics system is provided. The method includes determining moving object operation behaviors of an operator of a moving object corresponding to respective select contextual combinations, generating a personalized base characteristic for each select contextual combination, recognizing a cognitive state based on a comparison of actual moving object operation behaviors associated with the select contextual combinations and corresponding ones of the personalized base characteristics, and automatically triggering one or more actions based on the cognitive state.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The embodiments described herein implement cognitive state recognition within a telematics system. For example, using data obtained via a telematics system implemented with respect to a moving object or vehicle associated with an operator, a set of contextual combinations can be generated, one or more specific contextual combinations from the set can identified, a personalized profile can be built for different contextual combinations based on the one or more select contextual combinations, and a cognitive state recognizer can identify a cognitive state of the operator. Additionally, the embodiments described herein can implement one or more actions based on the determined cognitive state, such as actions to alleviate negative cognitive states. Accordingly, the embodiments described herein can provide contextual and personalized cognitive state awareness by capturing relationships between operator behavior and cognitive state, and thus can improve vehicle safety by ameliorating negative cognitive states.

For example, with respect to automobile operation, the telematics system described herein can identify, e.g., quick or jerky accelerating, which can be indicative of irritable behavior, harsh braking, which can be indicative of lack of focus or looseness, and continuous driving over a long time period, which can be indicative of fatigue or other. Additionally, cognitive state can be correlated to certain driving contexts such as, e.g., traffic condition (e.g., congestion or open road), weather (e.g., rainy, cloudy, sunny), road type (e.g., highway, urban road, suburban road, rural road), and time of day (e.g., rush hour, morning, afternoon, night).

Figure 1:
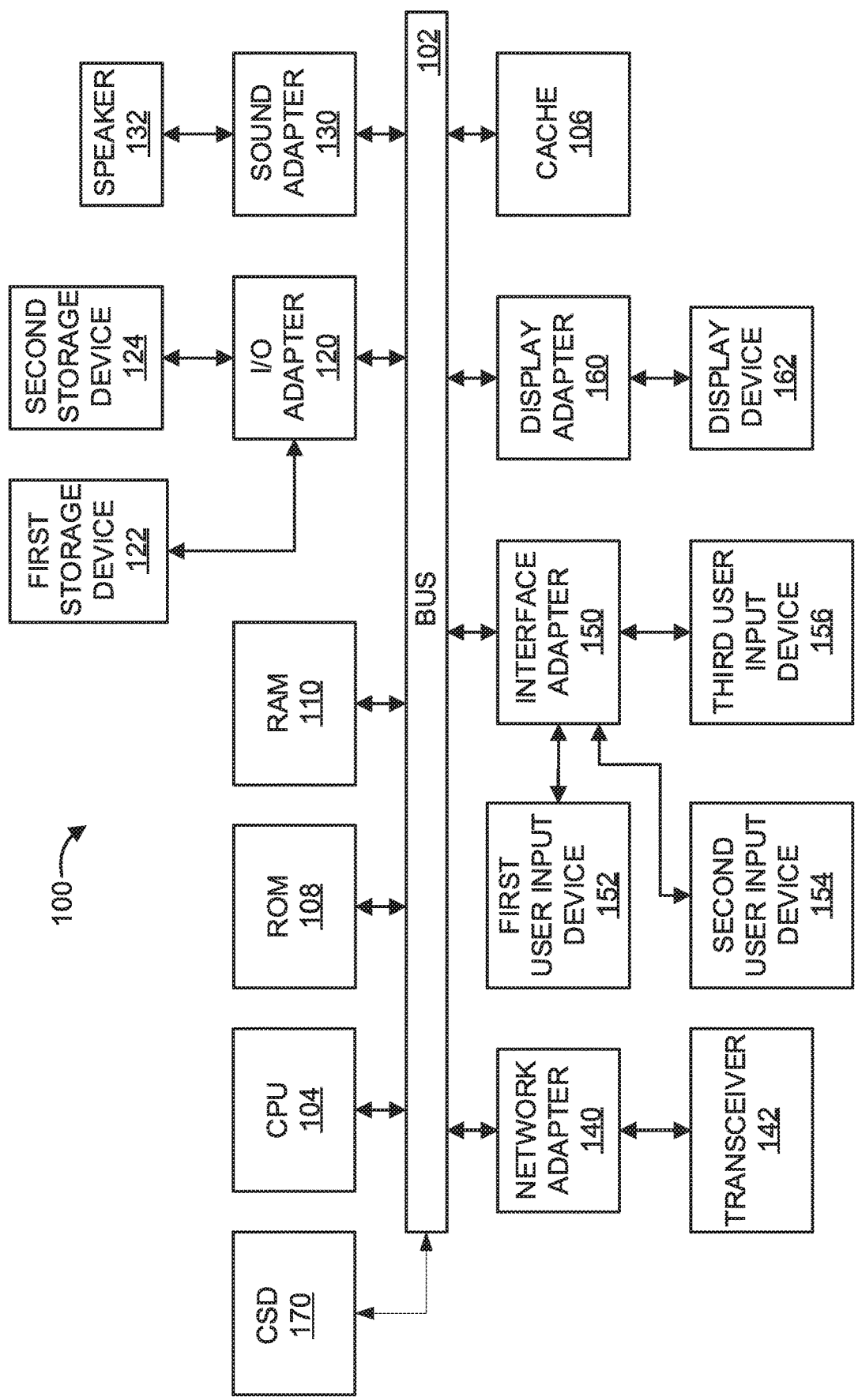
FIG. 1 is a block diagram of a processing system, in accordance with an embodiment of the present invention.

Referring now to the drawings in which like numerals represent the same or similar elements and initially to FIG. 1, an exemplary processing system 100 to which the present invention may be applied is shown in accordance with one embodiment. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

In one embodiment, the user input devices 152, 154, and 156 can include one or more devices configured to monitor the cognitive state of an operator of a vehicle in real-time (e.g., one or more biometric sensors). For example, at least one of the user input devices 152, 154 and 156 can include a camera configured to perform real-time facial recognition on the operator to identify a cognitive state of the operator based on facial expressions. As another example, at least one of the user input devices 152, 154 and 156 can include a device that can measure indicators of cognitive state (e.g., heart rate and breathing rate). For instance, at least one of the user input devices 152, 154 and 156 can include a wearable device including heart rate and/or breathing rate monitoring technology.

Cognitive state detection (CSD) component 170 may be operatively coupled to system bus 102. CSD component 170 is configured to recognize a cognitive state of an operator of a moving object (e.g., vehicle) as described in further detail below. CSD component 170 can be implemented as a standalone special purpose hardware device, or may be implemented as software stored on a storage device. In the embodiment in which CSD component 170 is software-implemented, although shown as a separate component of the computer system 100, CSD component 170 can be stored on, e.g., the first storage device 122 and/or the second storage device 124. Alternatively, CSD component 170 can be stored on a separate storage device (not shown).

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
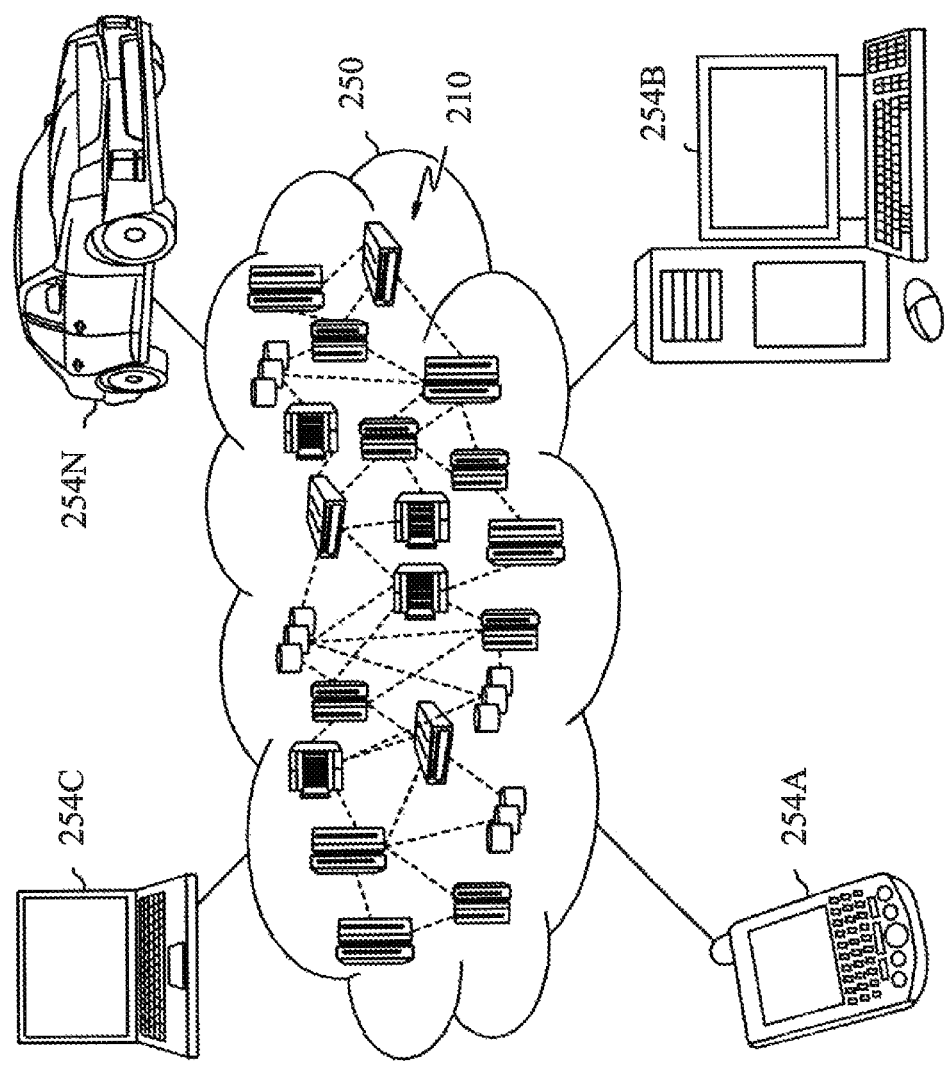
FIG. 2 is a block diagram of an illustrative cloud computing environment having one or more cloud computing nodes with which local computing devices used by cloud consumers communicate, in accordance with an embodiment of the present invention.

Referring now to FIG. 2, illustrative cloud computing environment 250 is depicted. As shown, cloud computing environment 250 includes one or more cloud computing nodes 210 with which local computing devices used by cloud consumers, such as, for example, personal digital assistant (PDA) or cellular telephone 254A, desktop computer 254B, laptop computer 254C, and/or automobile computer system 254N may communicate. Nodes 210 may communicate with one another. They may be grouped (not shown) physically or virtually, in one or more networks, such as Private, Community, Public, or Hybrid clouds as described hereinabove, or a combination thereof. This allows cloud computing environment 150 to offer infrastructure, platforms and/or software as services for which a cloud consumer does not need to maintain resources on a local computing device. It is understood that the types of computing devices 254A-N shown in FIG. 2 are intended to be illustrative only and that computing nodes 210 and cloud computing environment 250 can communicate with any type of computerized device over any type of network and/or network addressable connection (e.g., using a web browser).

Figure 3:
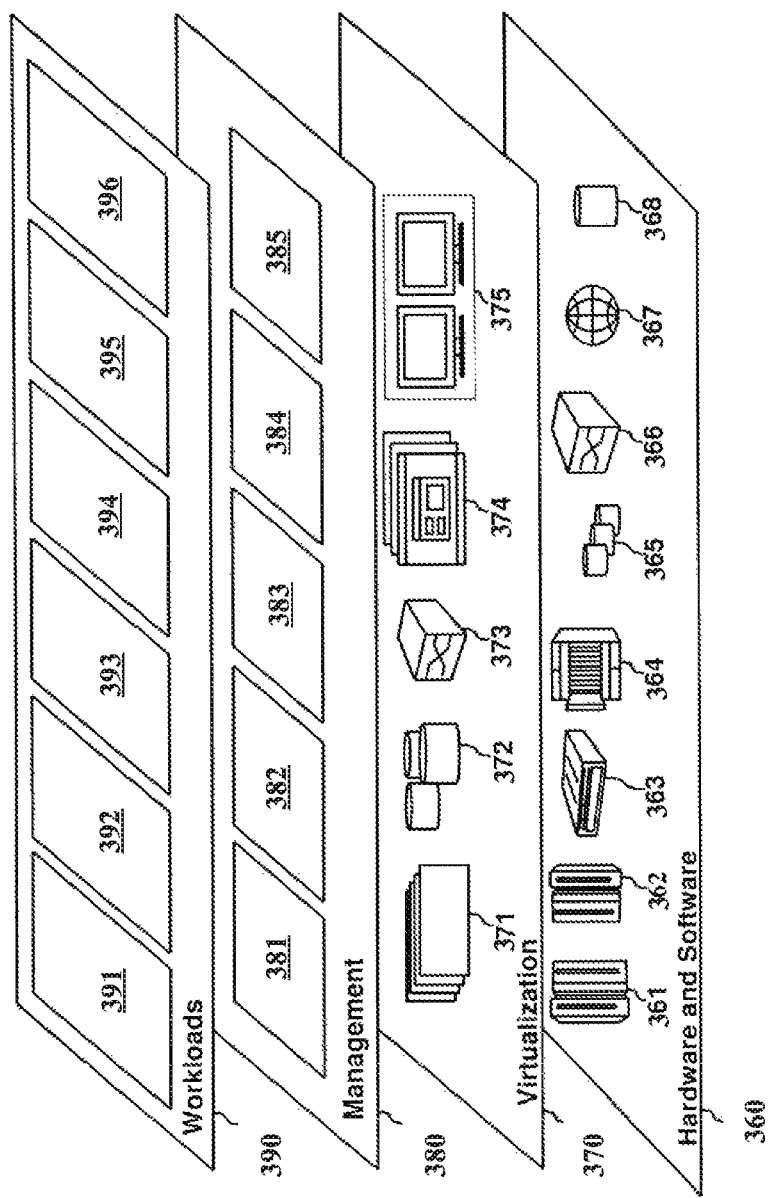
FIG. 3 is a block diagram of a set of functional abstraction layers provided by a cloud computing environment, in accordance with an embodiment of the present invention.

Referring now to FIG. 3, a set of functional abstraction layers provided by cloud computing environment 250 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 360 includes hardware and software components. Examples of hardware components include: mainframes 361; RISC (Reduced Instruction Set Computer) architecture based servers 362; servers 363; blade servers 364; storage devices 365; and networks and networking components 366. In some embodiments, software components include network application server software 367 and database software 368.

Virtualization layer 370 provides an abstraction layer from which the following examples of virtual entities may be provided: virtual servers 371; virtual storage 372; virtual networks 373, including virtual private networks; virtual applications and operating systems 374; and virtual clients 375.

In one example, management layer 380 may provide the functions described below. Resource provisioning 381 provides dynamic procurement of computing resources and other resources that are utilized to perform tasks within the cloud computing environment. Metering and Pricing 382 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 383 provides access to the cloud computing environment for consumers and system administrators. Service level management 384 provides cloud computing resource allocation and management such that required service levels are met. Service Level Agreement (SLA) planning and fulfillment 385 provide pre-arrangement for, and procurement of, cloud computing resources for which a future requirement is anticipated in accordance with an SLA.

Workloads layer 390 provides examples of functionality for which the cloud computing environment may be utilized. Examples of workloads and functions which may be provided from this layer include: mapping and navigation 391; software development and lifecycle management 392; virtual classroom education delivery 393; data analytics processing 394; transaction processing 395; and telematics data processing 396.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 4:
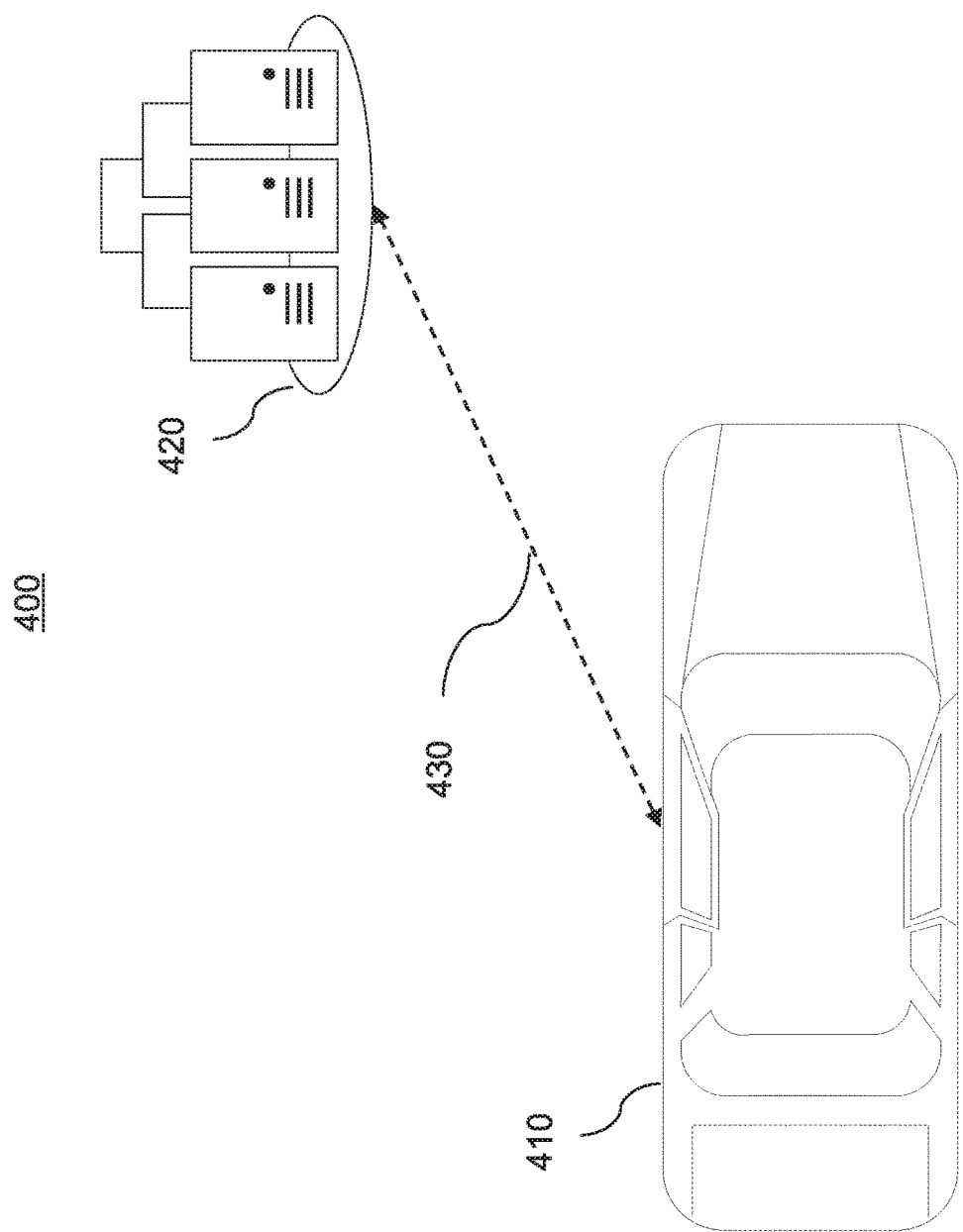
FIG. 4 is a diagram of a telematics system, in accordance with an embodiment of the present invention.

With reference to FIG. 4, a diagram is provided illustrating an exemplary telematics network 400 including a vehicle 410 in communication with a central processing system 420 (e.g., one or more servers) via at least one network connection 430. The network connection can be used to transmit data between the vehicle 410 and the central processing system 420. In this illustrative embodiment, the vehicle 410 is depicted as a car. However, the embodiments can be applied to any suitable vehicle (e.g., truck, bus, boat, plane, helicopter).

Telematics generally refers to technology associated with transferring information over telecommunications networks (e.g., via machine-to-machine (M2M) communication). Telematics technology can be used within the vehicle 410 to monitor motor vehicle usage. Illustratively, the telematics technology within the vehicle 410 can be used to implement usage-based insurance (UBI) (e.g., "pay how you drive" (PHYD) insurance), where driving behavior data (e.g., how often a driver brakes, how hard a driver accelerates, driving mileage, driving time, time of day of vehicle use) is collected over time, and sent to insurance companies to dynamically assess risk for determining insurance costs. For example, driving behavior data corresponding to aggressive or risky driving can lead to higher insurance costs as compared to driving behavior data corresponding to safer driving habits.

More specifically, on-board technology and/or mobile devices connected to the vehicle 410 can be used to map and record a position and/or speed of the vehicle 410, and obtain data related to internal behavior of the vehicle 410. For example, such information can be collected via, e.g., insurer installed devices (e.g. dongles), black box devices, manufacturer-embedded telematics technology including UBI services, and/or mobile devices (e.g., as stand-alone devices or connected to the on-board technology).

In one embodiment, vehicle 410 can include one or more devices configured to monitor the cognitive state of an operator of a vehicle in real-time (e.g., one or more biometric sensors). For example, the vehicle 410 can include a camera configured to perform real-time facial recognition on the operator to identify a cognitive state of the operator based on facial expressions. As another example, the vehicle 410 can include a device that can measure indicators of cognitive state (e.g., heart rate and breathing rate). For instance, an operator of the vehicle 410 can equip at least one wearable device implementing heart rate and/or breathing rate monitoring technology.

As will be described in further detail below with reference to FIGS. 5 and 6, the central processing system 420 can use the data to infer contextual cognitive state of an operator of the vehicle 420, as opposed to absolute driving behavior. For example, anxious accelerating can be indicative of irritability, harsh braking can be indicative of lack of focus or looseness, and continuous driving mileage/time can be indicative of fatigue. Additionally, cognitive state during vehicle operation can be strongly correlated to certain contexts including, but not limited to, traffic condition (e.g., congestion vs. open road), weather (e.g., rain/snow vs. no precipitation), road type (e.g., highway vs. urban road vs. rural road), and time of day (e.g., rush hour vs. off-peak driving times). Thus, the central processing system 420 can incorporate such contexts in the analysis in order to provide a more accurate determination of cognitive state.

Based on the determined cognitive state, the central processing system 420 can automatically trigger one or more actions implemented by the vehicle 410. For example, the one or more actions can include one or more cognitive state relaxing actions. Each cognitive state relaxing action can be automatically triggered by the central processing system 420 to ameliorate a negative cognitive state as determined based on driving behavior. For example, each cognitive state relaxing action can be implemented to reduce anxiousness, irritability, fatigue, etc. Examples of cognitive state relaxing actions include, but are not limited to, automatically playing soothing, calming music, automatically adjusting the climate control settings in the moving object to increase operator comfort, automatically generating a notification to take a break from operating the moving object (e.g., dashboard and/or mobile device notification), etc.

Figure 5:
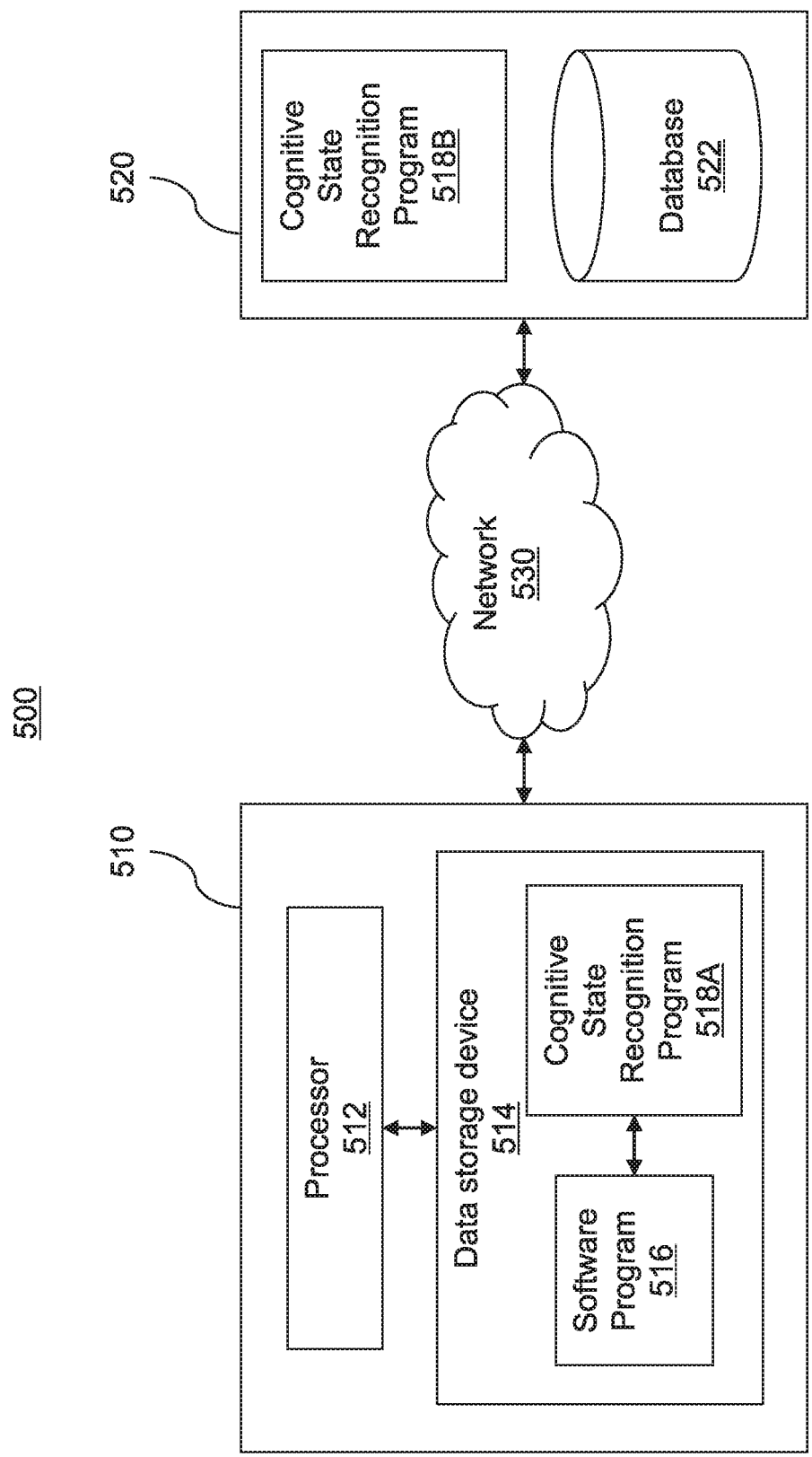
FIG. 5 is a block diagram of a telematics system architecture implementing cognitive state recognition, in accordance with an embodiment of the present invention.

With reference to FIG. 5, a block diagram is provided illustrating a telematics system architecture 500 implementing cognitive state recognition. The architecture 500 includes a client computing device 510 and a processing device (e.g., server) 520 interconnected via at least one communication network ("network") 530. For example, the client computing device 510 can be included within a vehicle (e.g., vehicle 410 of FIG. 4), while the processing device 520 can be included within a central processing system (e.g., central processing system 420 of FIG. 4).

In this illustrative embodiment, only one client computing device 510 and processing device 520 are shown for brevity. However, the architecture 500 can include a plurality of client computing devices and/or processing devices, in accordance with the embodiments described herein. Accordingly, is to be appreciated that FIG. 5 provides only an illustration of one implementation and does not imply any limitations with regard to the environments in which different embodiments may be implemented, and many modifications to the depicted environment may be made based on design and implementation requirements.

The network 530 may include various types of communication networks, such as a wide area network (WAN), local area network (LAN), a telecommunication network, a wireless network, a public switched network and/or a satellite network. The network 530 may include connections, such as wire, wireless communication links, or fiber optic cables.

Client computing device 510 may include a processor 512 and a data storage device 514 that is enabled to host and run a software program 516 and an cognitive state recognition program 518A, and communicate with the processing device 520 via the network 530. Client computing device 510 may be, for example, a mobile device, a telephone, a personal digital assistant, a netbook, a laptop computer, a tablet computer, a desktop computer, or any type of computing device capable of running a program and accessing a network.

Processing device 520 may be a laptop computer, netbook computer, personal computer (PC), a desktop computer, or any programmable electronic device or any network of programmable electronic devices capable of hosting and running an cognitive state recognition program 518B and a database 522. Processing device 520 may also operate in a cloud computing service model, such as Software as a Service (SaaS), Platform as a Service (PaaS), or Infrastructure as a Service (IaaS). Processing device 520 may also be located in a cloud computing deployment model, such as a private cloud, community cloud, public cloud, or hybrid cloud.

Software program 516 may represent any program or suite of programs that call or communicate with cognitive state recognition program 518A, 518B. For example, software program 516 can be a program or suite of telematics-based insurance software programs that call cognitive state recognition program 518A, 518B as a module for providing cognitive state recognition to analyze driving risk. In an alternate embodiment, software program 516 may be a database program that furnishes claim, weather, telematics, or any other data to cognitive state recognition program 518A, 518B. Software program 108 may be located anywhere within communication of the cognitive state recognition program 518A, 518B, such as on client computing device 510, processing device 520 or on any other device located within network 530. Furthermore, software program 108 may be distributed in its operation or location over multiple devices, such as client computing device 510 and processing device 520.

Figure 6:
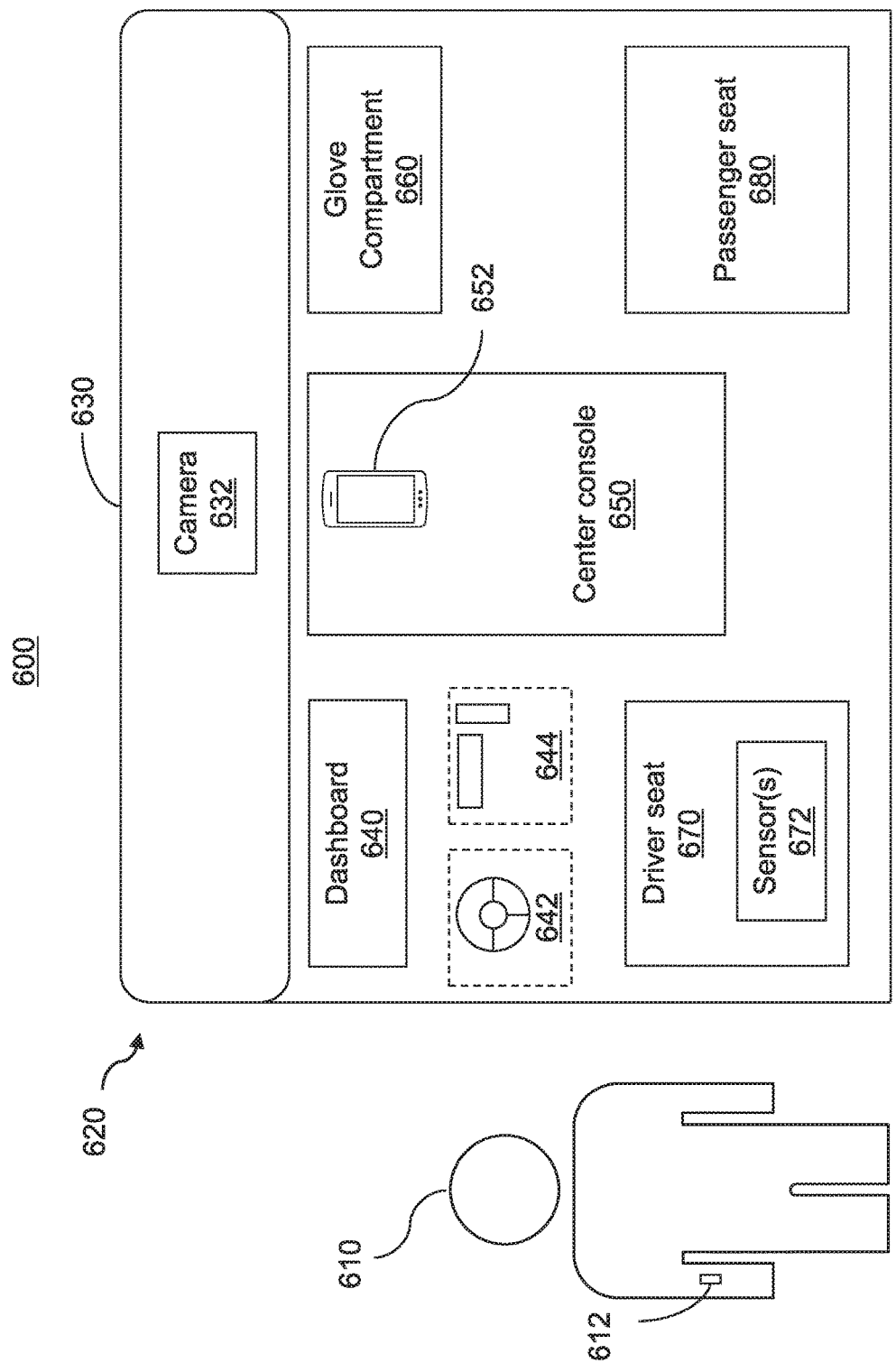
FIG. 6 is a block diagram of input devices for implementing cognitive state recognition within a telematics system, in accordance with an embodiment of the present invention.

With reference to FIG. 6, a diagram 600 is provided illustrating input devices for implementing cognitive state recognition within a telematics system. For example, data obtained from the input devices described in FIG. 6 can be used to recognize a cognitive state of an operator 610 of a moving object or vehicle 620.

As shown, the operator 610 can have a wearable device 612 configured to measure one or more indicators of a cognitive state. More specifically, the wearable device 612 can include one or more biometric sensors that can measure the one or more indicators of a cognitive state. For example, the wearable device 612 can include heart rate and/or breathing rate monitoring technology.

In this illustrative example, the vehicle 620 is an automobile. However, such an embodiment should not be considered limiting, and the vehicle 620 can be embodied as any type of moving object or vehicle in accordance with the embodiments described herein.

As shown, the vehicle 620 can include a windshield 630, dashboard 640, steering wheel 642, set of pedals 644 including brake and gas pedals, center console 650, glove compartment 660, driver seat 670 and passenger seat 680. In the event that the vehicle 620 has a manual transmission, the set of pedals 644 can further include a clutch pedal.

At least one camera 632 can be mounted to any suitable location(s) within the vehicle 620. For example, as shown in this illustrative embodiment, the camera 632 is mounted to the windshield 630. The camera 632 is configured to perform real-time facial recognition on the operator 610 to identify a cognitive state of the operator 610 based on facial expressions.

The dashboard 640 can be configured to notify the operator 610 to take a break from operating the vehicle 620 to ameliorate a negative cognitive state determined based on driving behavior.

The steering wheel 642 can include one or more sensors configured to measure one or more indicators of a cognitive state of the operator 610. For example, the steering wheel 642 can include one or more grip sensors configured to measure heart rate of the operator 610 while the operator 610 is operating the vehicle 620.

Data can be obtained in real-time based on the set of pedals 644. For example, acceleration and/or braking data can be obtained in real-time from the gas pedal and/or brake pedal of the set of pedals 644 during operation of the vehicle 620. Such data can provide an indication of, e.g., anxious acceleration and harsh braking, which can be used to identify a cognitive state of the operator 610.

At least one mobile device (e.g., smartphone 652) can be mounted to any suitable location(s) within the vehicle 620. For example, as shown in this illustrative embodiment, the mobile device 652 is mounted to the center console 650. The mobile device 652 can be configured to provide real-time vehicle operation data for implementing cognitive state recognition. For example, data can be obtained from one or more sensors of the mobile device 652 (e.g., accelerometer, GPS, gyroscope, magnetometer). Similar to the dashboard 640, the mobile device 652 can be further configured to notify the operator 610 to take a break from operating the vehicle 620 to ameliorate a negative cognitive state determined based on driving behavior.

One or more sensors 672 can be embedded within the driver seat 670 to measure one or more indicators of a cognitive state of the operator 610. For example, the one or more sensor 672 can detect where the weight of the operator 610 is concentrated on the driver seat 670 while operating the vehicle 620, which can be indicative of an amount of stress or tension that operator 610 is experiencing. For example, a higher concentration of weight of the operator 610 detected toward the front of driver seat 670 as compared to the back of the driver seat 670, caused by the operator 610 leaning forward in the driver seat, can be indicative of high stress or tension.

Further details regarding the operation of the systems described above with reference to FIGS. 4-6 will now be provided below with reference to FIG. 7.

Figure 7:
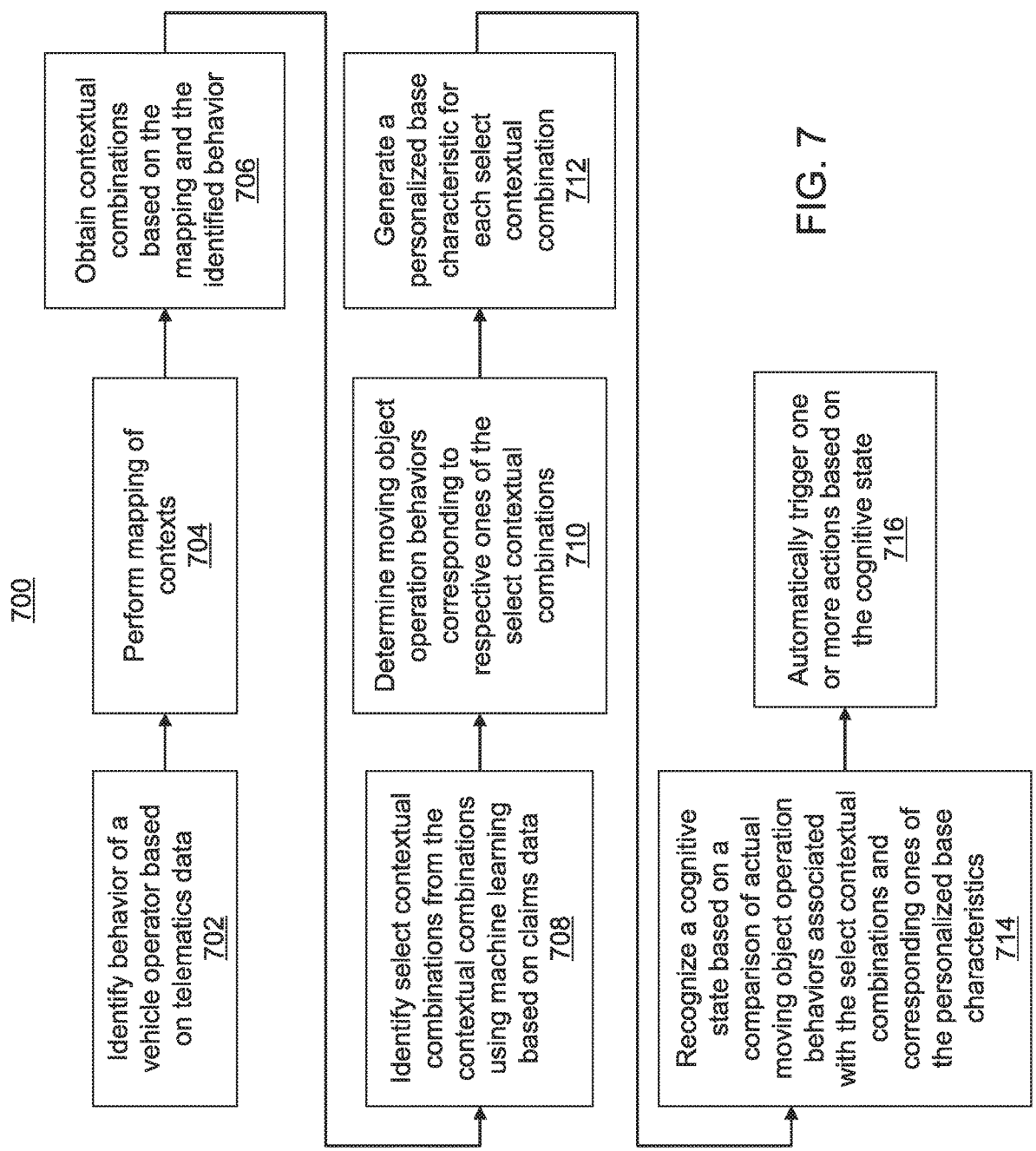
FIG. 7 is a block/flow diagram of a system/method for implementing cognitive state recognition within a telematics system, in accordance with an embodiment of the present invention.

With reference to FIG. 7, a block/flow diagram is provided illustrating a system/method 700 for implementing cognitive state recognition within a telematics system. Illustratively, the system/method 700 can be implemented by a central processing system including one or more processing devices, as described above with reference to FIGS. 4-6.

The system/method 700 can be broken up into a T1 phase and a T2 phase. As will be described in further detail, the T1 phase including blocks 702-706 corresponds to a sub-method for obtaining all contextual combinations, while the T2 phase including blocks 708-716 corresponds to a sub-method for obtaining select contextual combinations from the contextual combinations.

At block 702, behavior of an operator of a moving object (e.g., vehicle) is identified based on telematics data. Illustratively, the moving object can be an automobile operated by driver. For example, the telematics data can be obtained using telematics technology within a vehicle (e.g., insurer installed devices (e.g. dongles), black box devices, manufacturer-embedded telematics technology including UBI services, and/or mobile devices (e.g., as stand-alone devices or connected to the on-board technology)).

The identified behavior can include anxious acceleration, harsh braking, etc. In one embodiment, the driving behavior can be identified according to GPS driving attributes (e.g., timestamp, longitude, latitude, speed). The identified behavior can be represented as a tuple <moid, tripid, timestamp, driving.behavior.info>, where moid refers an identification number ("ID number") of the moving object, and tripid refers to an ID number associated with the trip.

By itself, the telematics data used to identify the behavior can provide an incomplete picture of the identified behavior. For example, from the telematics data alone, one might see that a person operates the moving object erratically on some portions of a trip and conclude that the operator is engaging in risky behavior. However, in reality, there could be external factors contributing to the erratic behavior.

To provide a more complete picture of behavior, at block 704, mapping of contexts is performed. Each context can include externalities that can affect vehicle operation. For example, the contexts can include one or more of road type, weather, traffic flow status, time of day, etc.

In one embodiment, the context mapping can be performed to merge similar types of contexts into a single context type. For example, with respect to weather, there can be a large number of weather types, so the frequency of occurrence of driving behaviors regarding some weather types can be relatively low. Accordingly, the context mapping can be performed to avoid sparse data results.

An illustrative example of weather type mapping is provided with reference to Table 1:

TABLE 1

| # | Weather |
|---|---|
| 1 | Rain, showers, drizzle |
| 2 | Thunderstorms, scattered thunderstorms, blowing dust/sandstorm |
| 3 | Snow, hail, sleet, freezing drizzle, freezing rain, wintry mix, blowing drifting snow, snow showers, flurries |
| 4 | Fog, haze, smoke |
| 5 | Windy |
| 6 | Cloudy |
| 7 | Mostly cloudy, partly cloudy |
| 8 | Sunny, fair, clear |

An illustrative example of road type mapping is provided with reference to Table 2:

TABLE 2

| Road type | Speed limit | High speed | Medium speed | Low speed |
|---|---|---|---|---|
| Highway/motorway | 120 km/h | V > 85 | 55 < V <= 85 | V <= 55 |
| Urban highway | 90 km/h | V > 65 | 35 < V <= 65 | V < = 35 |
| Secondary urban highway | 60 km/h | V > 40 | 20 < V <= 40 | V <= 20 |
| Urban road | 40 km/h | V > 35 | 15 < V <= 35 | V <= 15 |
| Others | 30 km/h | V > 20 | 10 < V <= 20 | V <= 10 |

An illustrative example of traffic flow status mapping is provided with reference to Table 3:

TABLE 3

| # | Traffic flow status |
|---|---|
| 0 | SevereCongestion |
| 1 | Congestion |
| 2 | SteadyFlow |
| 3 | FreeFlow |

An illustrative example of time of day mapping is provided with reference to Table 4:

TABLE 4

| # | Time of day |
|---|---|
| 0 | MorningPeak (7:00 AM-10:00 AM) |
| 1 | Day (10:00 AM-5:00 PM) |
| 2 | NightPeak (5:00 PM-8:00 PM) |
| 3 | Night (8:00 PM-7:00 AM) |

In another embodiment, the contextual combination mapping can be performed to split continuous values into discrete enumerations (e.g., traffic flow status).

With the added context provided by the context mapping, one might see that erratic behavior is caused by external factors that may necessitate the moving object to be operated in an erratic manner to reduce risk of accident. Therefore, the context mapping can be needed to correctly interpret the telematics data.

At block 706, contextual combinations are obtained based on the mapping and the identified behavior.

Obtaining the contextual combinations at block 706 can include combining the contexts into one or more tuples. For example, a tuple can be represented as <timeslot, weather_type, road_type, traffic status, . . . >. Examples of such tuples can include <nightPeak, rainy, highway, freeflow . . . >, <day, sunny, urban-road, congestion . . . >, etc.

Obtaining the contextual combinations at block 706 can further include splitting a trip into trip segments based on changes in contextual combinations. For example, if a first portion of a trip is associated with the tuple <day, sunny, urban-road, congestion . . . > and a second portion of the trip is associated with the tuple <nightPeak, rainy, highway, freeflow>, then the trip can be split based on this change. Each portion can be associated with a range of timestamps. For example, if a trip has a total time of $T_n$ and is split into two trip segments, the first portion of the trip can be associated with trip segment <$T_1$-$T_m$>, and the second portion of the trip can be associated with trip segment <$T_{m+1}$-$T_n$>. Splitting the trip into trip segments can ensure that each trip segment has a single corresponding contextual combination.

Obtaining contextual combinations at block 706 can further include associating driving behaviors to contextual combinations by assigning the driving behaviors into respective trip segments. For example, in the above example, if a given driving behavior occurred at timestamp $T_{m-1}$, then the given driving behavior can be assigned to the trip segment <$T_1$-$T_m$>, and thus the driving behavior can be associated with the contextual combination <day, sunny, urban-road, congestion . . . >. The contextual combinations can be represented as contextual driving behavior tuples of the form <moid, tripid, ctx-seg-T1, behaviors>, where ctx-seg-T1 is a corresponding contextual combination in the T1 phase.

Now that the contextual driving behaviors have been determined, the system/method 700 can proceed to the T2 phase starting at block 708.

At block 708, select contextual combinations are identified from the select contextual combinations using machine learning based on historical data. The identification of select contextual combinations can be done to reduce the size of the contextual combination space.

The historical data can include insurance claims data obtained from an insurance company. For example, the insurance claims data can include data filed as part of an insurance claim in the past, such as, e.g., driver name, policy number, make and model of the vehicle, date and time of the incident, personal data of drivers, passengers and witnesses, and other information relevant to an incident that is the subject of an insurance claim. The insurance claims data may be received from a program, may be retrieved from a data repository in communication with a software program (e.g., software program 518B of FIG. 5) from a website or web service, etc.

More specifically, the identification at block 708 can be performed by building a mapping table of the driver's contextual combination features (e.g., behavior per mileage, mileage) and claim rate. Then, machine learning can be used to identify select contextual combinations from the mapping table. For example, a feature selection technique can be used to identify the select contextual combinations. Examples of feature selection techniques that can be used in accordance with the embodiments described herein include, but are not limited to, least absolute shrinkage and selection operator (LASSO), random forest, Pearson correlation coefficient based methods, etc. In one embodiment, claims data from the insurance company can be used to evaluate/score each contextual combination. Each select contextual combination can have a corresponding weight. Accordingly, a select contextual combination can be identified with its weight by the tuple <select contextual combination, weight>.

To calculate the weight, a statistic linear regression model can be used. One example of a suitable statistical linear regression model may be a Poisson probability distribution modeling the number of claims occurring over a period of time or mileage Δt according to the following function:

$$Pr(k) = \frac{(\lambda \Delta t)^k}{k!} e^{-(\lambda \Delta t)}$$

where k is the number of claims over Δt, and λ is the claim occurrence rate (e.g., the average number of claims per unit of time or mileage). The weight can be set equal to the normalization of the claim occurrence rate.

At block 710, moving object operation behaviors corresponding to respective ones of the select contextual combinations are determined. The determination performed at block 710 is similar to that performed at block 706, except that the splitting of the trip occurs at select trip segments, as opposed to each contextual combination, and the moving object operation behaviors determined at block 710 can be aligned with corresponding select trip segments and contexts.

At block 712, a personalized base characteristic is generated for each select contextual combination. For example, the personalized base characteristic for a select contextual combination can be generated by building a tuple <moid, select-context-combination-id, weight, cognitive-state-id, BaseMeasure>, which can be defined by a certain rule. The cognitive-state-id is an ID corresponding to a cognitive state during operation of the moving object (e.g., irritability derived from anxious accelerating). The BaseMeasure can refer to a number of personalized driving behaviors per unit of mileage and/or time under the corresponding select contextual combination (e.g., an average base rate of a driving behavior).

Illustratively, irritability can have two related driving behaviors (e.g., a base measure associated with anxious accelerating and a base measure associated with harsh braking). For an operator "Operator_X" associated with a moving object, according to Operator_X's historical records, the average anxious acceleration base rate associated with Operator_X can be determined to be 1.7 anxious acceleration events per mile, while the average harsh braking base rate associated with Operator_X can be determined to be 2.3 harsh braking events per mile. So, Operator_X in this illustrative example can have the corresponding tuple table, where $SCC_i$ refers to an i-th select context combination:

<Operator_X, $SCC_i$, $weight_i$, irritability, anxious acceleration base rate 1.7>
<Operator_X, $SCC_i$, $weight_i$, irritability, harsh braking base rate 2.3>

At block 714, a cognitive state can be recognized based on a comparison of actual moving object operation behaviors associated with the select contextual combinations and corresponding ones of the personalized base characteristics. Examples of cognitive states that can be recognized include, e.g., anxiousness, irritability and fatigue. The comparison can be based on a formula, or can be based on a pre-defined rule.

In one embodiment, recognizing the cognitive state can include comparing a risk score to a threshold. Regarding risk scoring, the risk scoring assessment can take the form of any mathematically determined representation of risk, and may differ depending on the model used. For example, risk scoring can be computed as follows: $w_1*$(offset on $SCC_1$)+ $w_2*$(offset on $SCC_2$)+ . . . +$w_n*$(offset on $SCC_n$), where an offset corresponding to select contextual combination $SCC_i$ is an offset determined by comparing an actual rate of a moving object operation behavior to the corresponding base rate of the moving object operation behavior, and each $w_i$ is a weight corresponding to $SCC_i$. That is, the offset corresponding to SCC represents a deviation to the BaseMeasure under $SCC_i$. If the risk scoring calculated exceeds a threshold, then the cognitive state can be recognized. In one embodiment, the user can be classified (e.g., using machine learning classification techniques) to a risk category (e.g., high/medium/low risk).

As an example of offset calculation, in the current trip of Operator_X corresponding to $SCC_i$, it is determined that the actual anxious acceleration rate associated with Operator_X is 2.0 and the actual harsh braking rate associated with Operator_X is 3.0. As mentioned above, the base anxious acceleration rate is 1.7 and the base harsh braking rate is 2.3 Based on this, the anxious acceleration offset can be determined to be 2.0-1.7=0.3, and the harsh braking offset can be determined to be 3.0-2.3=0.7.

Additionally or alternatively, the cognitive state can be recognized based on one or more user input devices configured to monitor the cognitive state of the operator in real-time (e.g., one or more biometric sensors), as described above with reference to FIGS. 1 and 6. For example, the one or more user input devices can include a camera configured to perform real-time facial recognition on the operator to identify a cognitive state of the operator based on facial expressions. As another example, the one or more user input devices can include a device that can measure indicators of cognitive state (e.g., heart rate and breathing rate). For instance, the one or more user input devices can include a wearable device including heart rate and/or breathing rate monitoring technology.

At block 716, one or more actions are automatically triggered based on the cognitive state.

For example, the one or more actions can include one or more cognitive state relaxing actions. Each cognitive state relaxing action can be automatically triggered by the central processing system for implementation by the moving object to ameliorate a negative cognitive state as determined based on driving behavior. For example, each cognitive state relaxing action can be implemented to reduce anxiousness, irritability, fatigue, etc. Examples of cognitive state relaxing actions include, but are not limited to, automatically playing soothing, calming music, automatically adjusting the climate control settings in the moving object to increase operator comfort, automatically generating a notification to take a break from operating the moving object (e.g., dashboard and/or mobile device notification), etc.

As another example, the one or more actions can include updating moving object operation data associated with the operator.

Having described preferred embodiments of systems and methods of implementing cognitive state recognition within a telematics system (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed:

1. A system for implementing cognitive state recognition within a telematics system, comprising:
a memory device for storing program code; and
at least one processor device operatively coupled to the memory device and configured to execute program code stored on the memory device to:
determine moving object operation behaviors of an operator of a moving object corresponding to respective ones of a plurality of select contextual combinations;
generate a plurality of personalized base characteristics by building a plurality of tuples for each of the select contextual combinations, each of the tuples including a base measure associated with an average base rate of a driving behavior;
recognize a cognitive state based on a comparison of actual moving object operation behaviors associated with the select contextual combinations and corresponding ones of the personalized base characteristics; and
automatically trigger one or more actions based on the cognitive state.

2. The system of claim 1, wherein the at least one processor device is further configured to:
identify behavior of the operator based on telematics data;
perform a mapping of contexts;
obtain contextual combinations based on the mapping; and
identify the select contextual combinations from the contextual combinations using machine learning based on historical data.

3. The system of claim 1, wherein each of the tuples further includes a moving object identification number, a select contextual combination identification number, a weight, and a cognitive state identification number corresponding to a cognitive state.

4. The system of claim 1, wherein the at least one processor device is configured to recognize the cognitive state by calculating a risk score based on offsets corresponding to the select contextual combinations, and determining that the risk score exceeds a threshold.

5. The system of claim 4, wherein the risk score is calculated as a normalized sum of the offsets.

6. The system of claim 1, wherein the one or more actions include one or more cognitive state relaxing actions to ameliorate a negative cognitive state.

7. The system of claim 1, wherein the one or more actions include updating moving object operation data associated with the operator.

8. A computer-implemented method for implementing cognitive state recognition within a telematics system, comprising:
determining moving object operation behaviors of an operator of a moving object corresponding to respective ones of a plurality of select contextual combinations;
generating a plurality of personalized base characteristics by building a plurality of tuples for each of the select contextual combinations, each of the tuples including a base measure associated with an average base rate of a driving behavior;
recognizing a cognitive state based on a comparison of actual moving object operation behaviors associated with the select contextual combinations and corresponding ones of the personalized base characteristics; and
automatically triggering one or more actions based on the cognitive state.

9. The method of claim 8, further comprising:
identifying behavior of the operator based on telematics data;
performing a mapping of contexts based on the identified behavior;
obtaining contextual combinations based on the mapping and the identified behavior; and
identifying the select contextual combinations from the contextual combinations using machine learning based on historical data.

10. The method of claim 8, wherein each of the tuples further includes a moving object identification number, a select contextual combination identification number, a weight, and a cognitive state identification number corresponding to a cognitive state.

11. The method of claim 8, wherein recognizing the cognitive state further includes calculating a risk score based on offsets corresponding to the select contextual combinations, and determining that the risk score exceeds a threshold.

12. The method of claim 11, wherein the risk score is calculated as a normalized sum of the offsets.

13. The method of claim 8, wherein the one or more actions include one or more cognitive state relaxing actions to ameliorate a negative cognitive state.

14. The method of claim 8, wherein the one or more actions include updating moving object operation data associated with the operator.

15. A computer program product comprising a non-transitory computer readable storage medium having program instructions embodied therewith, the program instructions executable by a computer to cause the computer to perform a method for implementing cognitive state recognition within a telematics system, the method performed by the computer comprising:
determining moving object operation behaviors of an operator of a moving object corresponding to respective ones of a plurality of select contextual combinations;
generating a plurality of personalized base characteristics by building a plurality of tuples for each of the select contextual combinations, each of the tuples including a base measure associated with an average base rate of a driving behavior;
recognizing a cognitive state based on a comparison of actual moving object operation behaviors associated with the select contextual combinations and corresponding ones of the personalized base characteristics; and
automatically triggering one or more actions based on the cognitive state.

16. The computer program product of claim 15, wherein the method further includes:
identifying behavior of the operator based on telematics data;
performing a mapping of contexts based on the identified behavior;
obtaining contextual combinations based on the mapping and the identified behavior; and
identifying the select contextual combinations from the contextual combinations using machine learning based on historical data.

17. The computer program product of claim 15, wherein each of the tuples further includes a moving object identification number, a select contextual combination identification number, a weight, and a cognitive state identification number corresponding to a cognitive state.

18. The computer program product of claim 15, wherein recognizing the cognitive state further includes calculating a risk score based on offsets corresponding to the select contextual combinations, and determining that the risk score exceeds a threshold, and wherein the risk score is calculated as a normalized sum of the offsets.

19. The computer program product of claim 15, wherein the one or more actions include one or more cognitive state relaxing actions to ameliorate a negative cognitive state.

20. The computer program product of claim 15, wherein the one or more actions include updating moving object operation data associated with the operator.

* * * * *